Feb. 8, 1927. Re. 16,544

H. L. GRANT

PROTECTING DEVICE FOR ELECTRIC DETONATORS

Original Filed Nov. 6, 1924

Inventor

Harry L. Grant,

By Samuel Herrick,

Attorney

Reissued Feb. 8, 1927. Re. 16,544

UNITED STATES PATENT OFFICE.

HARRY L. GRANT, OF TAMAQUA, PENNSYLVANIA, ASSIGNOR TO ATLAS POWDER COMPANY, OF WILMINGTON, DELAWARE, A CORPORATION OF DELAWARE.

PROTECTING DEVICE FOR ELECTRIC DETONATORS.

Original No. 1,583,922, dated May 11, 1926, Serial No. 748,214, filed November 6, 1924. Application for reissue filed August 13, 1926. Serial No. 129,065.

This invention relates to a protecting device for electric detonators. The primary object of the invention is to provide a device of a simple and inexpensive nature adapted to be applied to the lead in wires of electric detonators and which will serve, while it is in place, to guard against the possibility of the detonator being prematurely exploded by its lead in wires accidentally coming in contact with the source of E. M. F.

Figure 1:
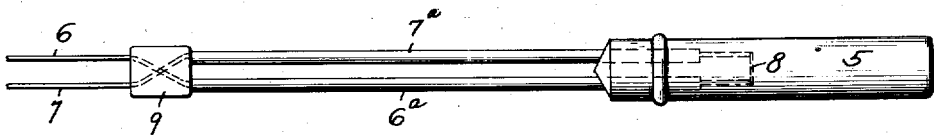
Figure 2:
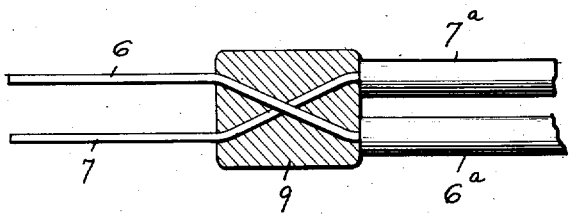

The nature and application of the invention will be readily understood by reference to the accompanying drawing in which:

Figure 1 is an elevation of an electric detonator and its lead in wires, having the device of the present invention applied thereto, and Figure 2 is an enlarged sectional view through the safety device or shunt, illustrating its application to the lead in wires.

Like numerals designate corresponding parts in both of the figures of the drawing.

Referring to the drawing, 5, designates the casing of an electric detonator and 6 and 7, the usual lead in wires which extend from said casing.

In the ordinary use of the detonator, the flow of current of sufficient strength past point 8 explodes the detonator or blasting cap. The lead in wires are insulated for some distance from the detonator, as indicated at $6^a$, $7^a$ and the ends of the lead in wires are left bare beyond the point where the insulation terminates, for ready application to the firing cable leading from a blasting machine.

In carrying out the present invention, the wires 6 and 7 are preferably crossed so that they touch each other at a point adjacent the termination of the insulation $6^a$, $7^a$ and at this point of contact of the wires the safety device is applied. This device consists of a soft metal body 9, such as lead for example, which may be pressed into firm contact with the wire, and in turn, hold the crossed portions of the wires in intimate contact with each other. When this is done the detonator will be effectually safeguarded against explosion if the exposed ends of the lead in wires should accidentally come in contact with a source of electrical energy. This is due to the fact that the securing of the wires in intimate contact with each other creates a short circuit at that point. If the exposed ends of the wires be accidentally, or otherwise, brought into contact with a source of E. M. F. of sufficient strength, those portions of the wire adjacent the point of contact may fuse and burn off, thereby completely disconnecting the detonator from the source of current. While I have described the wires as being crossed at the point of application of body 9 it is clear that a metal body of the character described would connect the wires and function as a protecting device in the manner set forth even if the wires were not crossed.

When it is desired to use the detonator the safety device may be stripped therefrom by pulling it longitudinally off the lead in wires and toward the free ends thereof. This action not only removes the safety device but it scrapes and cleans the exposed ends of the wires, leaving them ready for instant attachment to the blasting cable.

Since the insulation $6^a$, $7^a$ usually and preferably extends the entire distance from the safety device to the body 5 of the detonator it follows that contact of a source of E. M. F. with that portion of the lead in wires lying between the safety device and the detonator will not result in the explosion of the detonator. However, the device will give an appreciable and desirable measure of protection even if spaced somewhat from the insulation as long as it lies close enough thereto to prevent the creation of such difference of potential between the lead wires under the influence of stray currents, and inwardly of the point of application of the device, as might explode the detonator.

Assuming the shunt to be spaced far enough from the insulation so that a source of stray current can be imposed upon the lead wires between the shunt and insulation we would then have a divided path for the current; one from the point of contact of the stray current, on one of the lead wires, around through point 8 and thence back to the place of beginning but through the other lead wire; and the other from the point of contact on one wire forwardly through the shunt and back to the place of beginning, through the other lead wire. The flow of current in these two paths would be inversely proportional to the resistance of such paths and since the shunt, as illustrated, is of a considerable cross sectional area and electrical capacity, and since the path therethrough would, (especially if the shunt were spaced only a little way from the insulation) be of low resistance, it follows that the greater part of any current flow would be through the latter path rather than through point 8. When it is reflected that the stray or accidental currents likely to be encountered are usually of very low E. M. F. to start with, it follows that the chance of creating sufficient potential difference to bring about accidental explosion of the detonator, would be extremely remote. I wish to make it clear that, ordinarily, I will place the shunt against the insulation and thereby avoid all possibility of electrical contacts with the wires rearwardly thereof. However, it is incidentally a fact that the shunt may be spaced from the insulation and still give an appreciable and desirable measure of protection, for the reasons stated.

The device of the present invention is of utility at all times between the time of manufacture of the detonator and until the same is actually exploded on the job but it is of particular utility when the detonator is being transported and while it is being handled about the work preliminary to the actual firing of a charge. The complete structure of Fig. 1 constitutes a unit as shipped to the trade. In other words, the structure to be protected prior to its attachment to a main firing cable, comprises a detonator and the two lead wires, the inner portions of which are covered with insulation and the outer portions of which are left bare so that the user does not have to expend time in scraping them free of insulation at the time of use. Therefore, the term "lead in wires" as used in the claims, is intended to mean the wires which are combined with the individual detonators so that the whole constitutes a unit to be shipped to the trade.

It will be noted that the lead in wires are in bifilar form which prevents flow of induced currents. This, in conjunction with the safeguard afforded by the creation of the short circuit described, renders it certain that the detonator will not be exploded by stray currents from any source.

It is to be understood that the invention is not limited to any particular material for the body 9. It is manifest that any material which will hold the crossed portions of the wires in intimate contact with each other will carry out the essential object of the invention, viz, to create an electrical contact at the point of crossing of said wires.

However, I prefer to make the shunt from a soft metal such as lead or the like, in order that the shunt may be pressed firmly around the wires without injuring them in any manner and also make a more perfect electrical joint i. e. a joint with little or no contact resistance. By the use of a soft metal the shunt may be pressed on the wires firmly enough to cause it to conform to the shape of the wires where they pass through it, forming a joint similar to a soldered joint. This procedure is made possible by the use of a metal which is softer than the metal of which the detonator wires are made. Another advantage of the soft metal shunt is that the user may readily remove it by simply holding the wire with one hand and pulling it off with the other when ready to fire the shot.

It is to be understood that the invention includes within its purview whatever changes fairly come within either the terms or the spirit of the appended claims.

Having described my invention, what I claim is:

1. The combination with a detonator and its lead in wires having insulation thereon for a portion of their length, of a body embracing said wires directly at the termination of said insulation and holding them into contact with each other as long as it is in place.

2. The combination with a detonator and its lead in wires having insulation thereon for a portion of their length, of a body embracing the lead in wires directly at the point of termination of the insulation and holding said wires in crossed and intimate contact with each other as long as it is in place.

3. A structure as recited in claim 1 wherein said body is of material adapting it to be stripped longitudinally from said wire.

4. The combination with a detonator having lead in wires which are insulated for a portion of their length, of a soft metal body embracing said wires directly at the point of termination of the insulation and holding said wires in intimate contact with each other.

5. The combination with a detonator and the lead in wires having insulation thereon for a portion of their length, of a soft metal body embracing said wires directly at the point of termination of the insulation and holding the said wires in crossed relation at said point, said body being adapted to be stripped longitudinally from said wire.

6. An electrical shunt placed squarely against the insulation of the terminal wires of an electrical detonator, so as to prevent contact in any manner, of the detonator circuit, with stray electric current or conductors carrying electric current, and so made and applied, that the act of stripping the shunt from the terminal wires cleans the exposed ends of the said wires.

7. An electrical detonator in which a shunt made of a metal softer than that from which the terminal wires of the detonator are made, is placed squarely against the insulation of the terminal wires of the said electrical detonator.

8. The combination with a detonator, having bifilar lead wires, said lead wires having a covering of insulating material thereon for a portion of their length, outwardly, and being bare therebeyond, to provide means for attachment of the detonator to the common firing cable of a blasting machine, of a body mounted upon and electrically connecting said lead wires close enough to the point of termination of the insulating material to prevent the creation of a difference of potential between the lead wires rearwardly thereof, to thereby protect the detonator from explosion under the influence of an accidentally imposed E. M. F.

9. The combination with a detonator having the bifilar lead wires, individual thereto, said wires being insulated for a portion of their length outwardly and being bare therebeyond, of a body of conductive material uniting said wires at such point with respect to the termination of the insulation as to prevent the creation of such difference in potential in the detonator as to cause the premature explosion of the detonator under the influence of accidental or stray currents.

In testimony whereof, I affix my signature.

HARRY L. GRANT.